Figure 1:
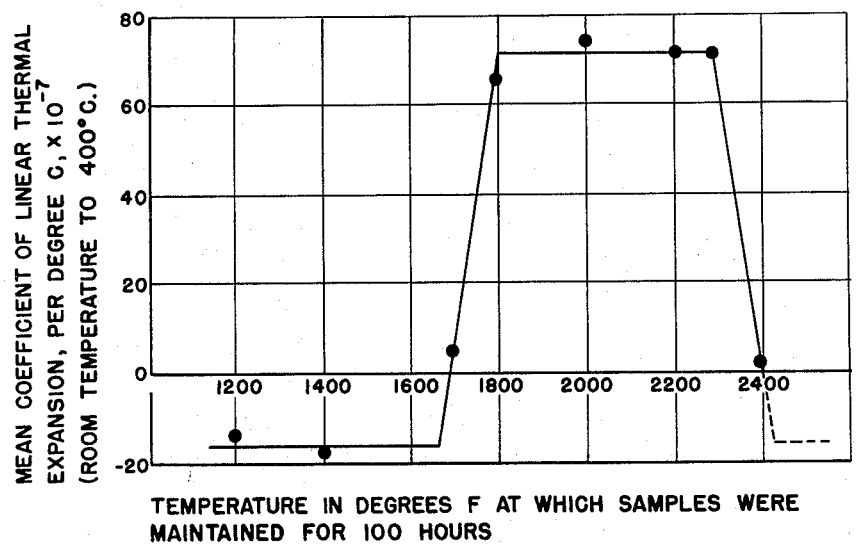

Jan. 8, 1957   C. G. HARMAN ET AL   2,776,896
CERAMIC COMPOSITION HAVING THERMAL SHOCK RESISTANCE
Filed Oct. 22, 1952   4 Sheets-Sheet 1

EFFECTS OF PROLONGED HEAT TREATMENT AT 2200° F ON THE COEFFICIENTS OF THERMAL EXPANSION OF ALUMINUM TITANATE BODIES CONTAINING ADDITIONS OF $Fe_2O_3 \cdot TiO_2$.

INVENTORS.
Cameron G. Harman.
BY John W. Lennon.
Wood, Herron & Evans.
ATTORNEYS.

LINEAR THERMAL EXPANSION OF FIRED BODIES COMPOSED $Al_2O_3 \cdot TiO_2$ PLUS $Fe_2O_3 \cdot TiO_2$ REHEATED AT 2200° F.

United States Patent Office 2,776,896
Patented Jan. 8, 1957

2,776,896

CERAMIC COMPOSITION HAVING THERMAL SHOCK RESISTANCE

Cameron G. Harman, Worthington, and John W. Lennon, Columbus, Ohio, assignors, by mesne assignments, to Cambridge Tile Manufacturing Company, Cincinnati, Ohio, a corporation of Ohio Application October 22, 1952, Serial No. 316,248

7 Claims. (Cl. 106—39)

This invention relates to ceramic compositions which are capable of withstanding exposure to relatively high temperatures for long periods of time without disintegrating or decomposing, and which are also capable of sustaining sudden changes in temperature without physically rupturing themselves.

The thermal shock resistance of the commoner varieties of ceramic compositions is governed mainly by the extent to which they expand or contract in undergoing change of temperature. When compositions having a high coefficient of linear expansion suffer a substantial change in temperature over a relatively short period of time, internal forces are developed which are likely to cause the materials to shatter; this is what occurs, for example, when a hot piece of ordinary glass is plunged into cold water. When the coefficient of expansion of the material in question is low, then it may pass abruptly from one temperature to another without suffering physical deterioration. Ceramic compositions which possess low expansion characteristics but which also possess the capacity of withstanding exposure to high temperature for long periods of time are required for many industrial purposes. The principal objective of this invention has been to produce relatively low cost compositions having such characteristics.

Both aluminum oxide or alumina, $Al_2O_3$, and titanium dioxide, $TiO_2$, hereafter called titania, are of a refractory nature insofar as they are capable of withstanding high temperature without decomposing, and both display relatively high coefficients of linear expansion. Peculiarly, however, it has been found that aluminum titanate, $Al_2O_3 \cdot TiO_2$, possesses an unusually low coefficient of expansion. In fact, from room temperature to approximately 600° C. the linear thermal expansion may be slightly negative; hence, the dimensions of a specimen decrease with increase in its temperature. Aluminum titanate conveniently may be formed by heating alumina and titania, in admixture, to a suitably high temperature, and since both alumina and titania are readily available at relatively low cost, it is apparent that aluminum titanate potentially constitutes a desirable ceramic composition possessing thermal shock resistance properties.

The trouble is that pure aluminum titanate does not have adequate physical strength for most purposes, and, more importantly, aluminum titanate decomposes back into alumina and titania when it is exposed to relatively high temperatures for appreciable periods of time. Thus, while aluminum titanate has a desirably low coefficient of expansion when formed initially, still, when reheated, the coefficient of expansion increases, according to time and temperature, until the expansion characteristics of the product approximate those of aluminum oxide and titania in their uncombined states. This increase in expansion denotes decomposition or reversion of aluminum titanate into its original constituents, $Al_2O_3$ and $TiO_2$.

This invention is predicted upon the discovery and determination that aluminum titanate can be stabilized against dissociation, whereby it is capable of withstanding prolonged heating to high temperature, or repeated reheating without significant loss of its low coefficient of expansion characteristics or thermal shock resistance properties, by the replacement of some of the cations in the aluminum titanate crystal without effecting any substantial change in the aluminum titanate structure or otherwise impairing its desirable properties. This can conveniently be done by the introduction of iron in the form of iron titanate, $Fe_2O_3 \cdot TiO_2$. Likewise, the introduction into the aluminum titanate crystal of magnesium or silicon or combinations thereof, with or without iron, results in somewhat similar properties as subsequently discussed herein. In addition, the admixture of clay and talc with an aluminum titanate which has been stabilized against thermal decomposition has been found to increase the physical strength or modulus of rupture of the composition without substantially increasing its low expansion characteristics. The present invention, therefore, contemplates ceramic bodies which are of refractory nature, which are physically strong, possess low expansion characteristics as initially fired, and do not decompose so as to lose those characteristics during repeated or prolonged reheating.

The presence of as little as approximately 1 to 2 mole percent if iron titanate, in the form of $Fe_2O_3 \cdot TiO_2$ in aluminum titanate, is capable of accomplishing the desired stabilization against thermal decomposition, depending on the ultimate use intended, and as much as 50 mole percent can be used without greatly altering the low coefficient of expansion. Evidence available at present is not adequate to explain fully the nature of the mechanism by which such stabilization is accomplished, but it is believed that the iron acts as a substituent for aluminum in the crystal structure without changing the type of aluminum titanate crystal and without producing a new crystal phase.

Such an effect is known as solid solution and is well illustrated by X-ray diffraction patterns taken on a series of compositions containing various proportions of $Al_2O_3 \cdot TiO_2$ and $Fe_2O_3 \cdot TiO_3$. These illustrate that the type of crystal does not change with varying proportions of constituents, but that the lattice dimensions do change slightly, causing a gradual shift in the positions of the lines of the diffraction pattern without changing the general character of the pattern. This shift is so gradual that it is not readily apparent except by comparing aluminum titanate directly with iron titanate. Microscopic examinations of given compositions reveal that only one crystal phase is present; depending upon proportions, this crystal phase presumably varies from substantially pure but unstable $Al_2O_3 \cdot TiO_2$ to substantially pure $Fe_2O_3 \cdot TiO_2$.

The incorporation of iron into aluminum titanate may be accomplished in various ways. In one method, for example, iron titanate may be mixed directly with aluminum titanate in desired proportion, then heated to a suitable temperature, such as above approximately 2400° F. As an alternative procedure, iron titanate may be formed in situ in the aluminum titanate crystal, as by mixing aluminum titanate with iron oxide ($Fe_2O_3$) and titania, the latter two components being proportioned to form iron titanate in the molecular quantity desired. These materials are then heated together to or above the temperature previously indicated. As a further alternative procedure, aluminum titanate and iron titanate may be formed and combined simultaneously by admixing aluminum oxide, iron oxide, and titania in proportions suitable to yield a desired mole percentage of aluminum titanate and a desired mole percentage of iron titanate within the ranges previously indicated, after which the mixture is fired as previously described.

It has been reported that aluminum titanate has two crystal forms, one of which is stable from approximately 3270° F. to the melting point at 3380° F., and the other is stable from approximately 3310° F. down to about 2370° F. However, present investigations show that when an aluminum titanate is heated for any significant period of time in the range of temperature between approximately 1700° and 2400° F., an abrupt increase occurs in the thermal expansion characteristics of the material. This increase is shown in Figure 1. Linear thermal expansion, which is relatively easy to measure by means of a dilatometer, has been found to provide a good indication of the effect produced by changes in temperature, processing or composition. Thus, the behavior of relatively pure aluminum titanate samples heated at various temperatures for 100 hours is illustrated in Figure 1. From this chart it will be noted that the linear coefficient of expansion of aluminum titanate remains substantially constant as to those samples which were soaked for 100 hours at various temperatures up to approximately 1700° F., but that in the temperature range from 1700° to approximately 2400° F. the aluminum titanate suffers decomposition, as indicated by the sharp increase in expansion characteristics.

In contrast with this behavior, the properties of two typical aluminum-iron titanate compositions subjected to 100 hours heat exposure at various temperatures are illustrated in the following table:

| Heating Temperature, °F. | Mean Coefficient of Linear Thermal Expansion per Deg. C. Between Room Temperature and 400° C. (After 100 Hours) [1] | |
|---|---|---|
| | ($90Al_2O_3 \cdot TiO_2$—) ($10Fe_2O_3 \cdot TiO_2$) | ($50Al_2O_3 \cdot TiO_2$—) ($50Fe_2O_3 \cdot TiO_2$) |
| 1,600 | | +7.3 |
| 2,000 | −21.5 | +5.5 |
| 2,200 | −20.1 | +6.3 |
| Prior to Any Heat Treatment | −23.5 | +5.8 |

[1] The values given are to be multiplied by a factor of $10^{-7}$.

Figure 2:
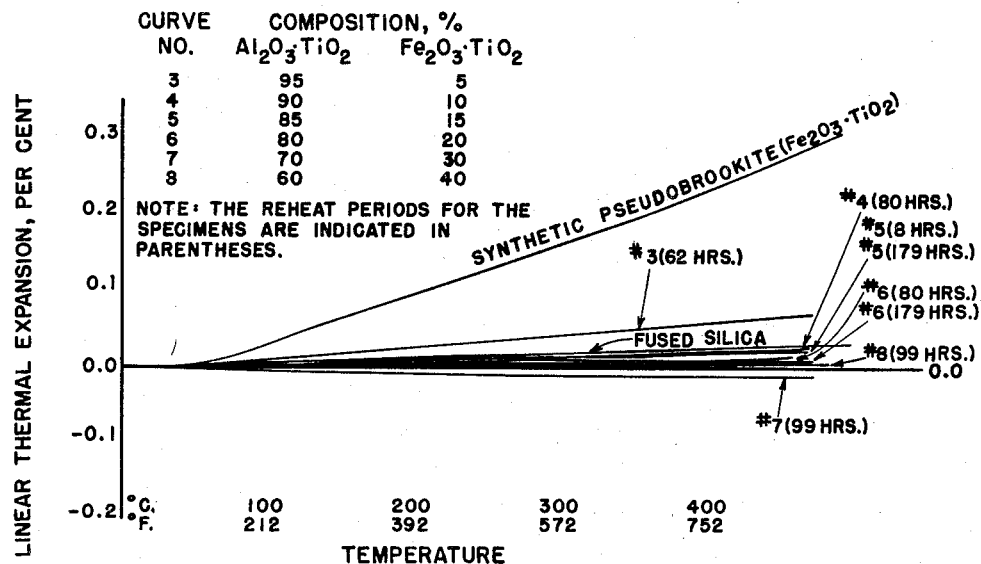

Figure 2 illustrates the linear thermal expansion of iron stabilized aluminum titanate compositions reheated to and maintained at 2200° F. for various periods of time, and shows the favorable stabilizing effect which is obtained. The effect is also shown of reheating upon pure iron tianate, $Fe_2O_3 \cdot TiO_2$, which we have arbitrarily labeled "synthetic pseudobrookite." This figure also shows that compositions prepared in accordance with the present invention compare most favorably with fused silica, which has been previously recognized as a material possessing high thermal shock resistance properties, but which reverts to a material having high thermal expansion characteristics upon prolonged heating to temperatures in excess of about 2000° F.

For practical purposes, the clay component may be of any suitable type, such as china or ball clay, and may be present to the extent of approximately 5 to 40% by weight of the total composition or may be omitted entirely. Talc, when used, preferably constitutes approximately 1 to 10% by weight of the composition and may be of any suitable variety.

In place of rutile, other titaniferous oxide may be substituted, such as ilmenite or anatase, although it may be noted that anatase converts automatically to rutile at approximately 1680° F. Also, when the composition is to be stabilized by the formation, in situ, of iron titanate, then titaniferous magnetite may be used as a source of the iron oxide and some of the titania. Other suitable sources will suggest themselves to those skilled in the art.

A typical body composition adapted for various industrial purposes in accordance with the present invention is as follows:

| Material: | Amount, percent by weight |
|---|---|
| Clay | 11 |
| Alumina | 44.6 |
| Iron oxide ($Fe_2O_3$) | 1.7 |
| Rutile | 42.7 |
| Total | 100.0 |

The clay shown in this composition is Tennessee No. 7 ball clay, air floated, and the alumina shown is a calcined low-soda alumina which may be ground to approximately −325 mesh particle size. The rutile is also milled to approximately −325 mesh fineness, and the iron oxide was of approximately the same fineness. Those skilled in the art will recognize that other materials providing sources of clay, alumina, titanium oxide, or talc may be employed, and that the specific sources and fineness of the materials given in the foregoing typical example are provided for identification purposes in connection with the discussion of the properties of the products which follow.

Ceramic shapes and forms may be prepared from stabilized aluminum titanate compositions either by dry pressing, by extrusion, or by casting. To illustrate, for dry pressing approximately 0.5 part of gum Ghatti are added per 100 parts of base material and approximately 8 parts of water. The dry components are initially mixed together, followed by a wet mix. Suitable pressing pressure is approximately 2000 lbs. per sq. in. For extrusion, similar proportions of base composition and gum may be used with somewhat more water, the quantity depending upon the type of extrusion equipment. Approximately 20 parts of water is suitable. For casting, 100 parts of base formula and approximately 0.4 part of sodium silicate having a ratio of $1Na_2O:3.25SiO_2$ by weight (for example, Philadelphia Quartz Company's "O" brand 42 degree Bé.), or 42 degree Bé. may be used with 23 parts of water. The aqueous sodium silicate solution may be blunged with the ball clay, after which the remaining components are added for additional mixing. The proportions in the foregoing processing data are by weight, and it will be noted that these examples are only given by way of illustration; various other proportions may be used as will readily be recognized by those skilled in the art.

The method or technique by which ceramic shape or bodies are prepared influences the strength which they process. By way of example, the physical properties of a composition containing 14.8 percent by weight of clay, 47.6 percent of alumina, 32.8 percent of rutile, and 4.8 percent of talc, when fabricated respectively by dry pressing, extrusion, and casting, are as follows:

| Firing Temperature, ° F. | 2,600 | 2,650 | 2,700 | 2,750 | 2,800 |
|---|---|---|---|---|---|
| Dry Press Method: | | | | | |
| Modulus of Rupture, p. s. i. | 3,212 | 3,273 | 3,126 | 2,730 | 2,671 |
| Absorption, percent | 8.2 | 8.1 | 8.0 | 7.5 | 6.1 |
| Die-to-Fired Shrinkage, percent | .06 | 0.83 | 1.6 | 1.3 | 5.2 |
| Coefficient of Expansion, Room Temperature at 400° C. (The values given are to be multiplied by $10^{-7}$) | 33 | 26 | 16 | 12 | −1.4 |
| Extrusion Method: | | | | | |
| Modulus of Rupture, p. s. i. | 5,710 | 5,337 | 4,550 | 3,355 | 3,517 |
| Absorption, percent | 10.5 | 10.2 | 9.5 | 8.1 | 6.4 |
| Die-to-Fired Shrinkage, percent | 3.7 | 5.3 | 6.2 | 6.2 | 7.1 |
| Casting Method: | | | | | |
| Modulus of Rupture, p. s. i. | 4,097 | 4,162 | 3,832 | 3,286 | 2,859 |
| Absorption, percent | 12.5 | 11.4 | 12.6 | 11.2 | 8.9 |
| Die-to-Fired Shrinkage, percent | 8.1 | 6.7 | 7.1 | 6.4 | 9.3 |

The coefficients of expansion of extruded and cast compositions referred to in the foregoing table were not precisely determined but are believed to be substantially the same as the coefficients of expansion of compositions made by dry pressing.

In general, the highest modulus of rupture is obtained by firing at 2600° F., whether the product being fired was produced by extrusion, slip casting, or dry pressing. The lowest thermal expansion is obtained in firing at 2800° F. Firing at intermediate temperatures results in intermediate magnitude of these properties. Absorption in terms of percent is lowest (approximately 6–9) when the products are fired at 2800° F., and runs approximately 8 (for dry pressing) to 13 (for slip casting) in firing at 2600° F.

The effect of 100 hour exposures at 2200° F. on the thermal expansion of the composition shown in the foregoing example is illustrated in the following table:

| | Coefficient of Expansion [1] (Room Temperature to 400° C.) |
|---|---|
| Number of Hours' Exposure at 2,200° F.: | |
| 0 | +1.9 |
| 100 | +6.5 |
| 200 | +10.8 |
| 300 | +11.2 |
| Pure $Al_2O_3 \cdot TiO_2$ as fired | −15 |
| Pure $Al_2O_3 \cdot TiO_2$ after 100 hours | +68 |

[1] Multiplied by $10^{-7}$.

Shrinkage determinations, in terms of diameter of specimen, have shown that cast specimens have the greatest shrinkage and dry pressed specimens the least. Cast specimens shrank about 9.3% when fired at 2800° F., but virtually no shrinkage was noted for specimens dry pressed and fired at 2600° F. Little difference was noted in the die-to-fired length shrinkage regardless of the method of forming.

Figure 3:
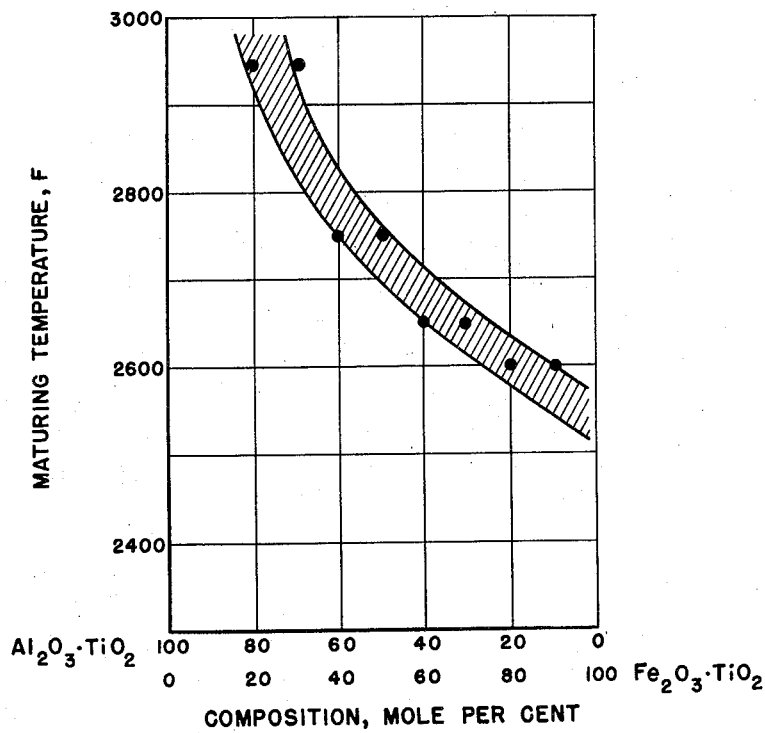

The quantity or proportion of iron which an aluminum titanate contains affects the temperature at which the composition matures. This is illustrated in Figure 3, from which it will be seen that the maturing temperature gradually decreases with an increase in the molecular proportion of $Fe_2O_3 \cdot TiO_2$. The shaded band represents the range of variation between the highest and lowest proportions of $Fe_2O_3 \cdot TiO_2$ in the samples tested at each maturing temperature.

Figure 4:
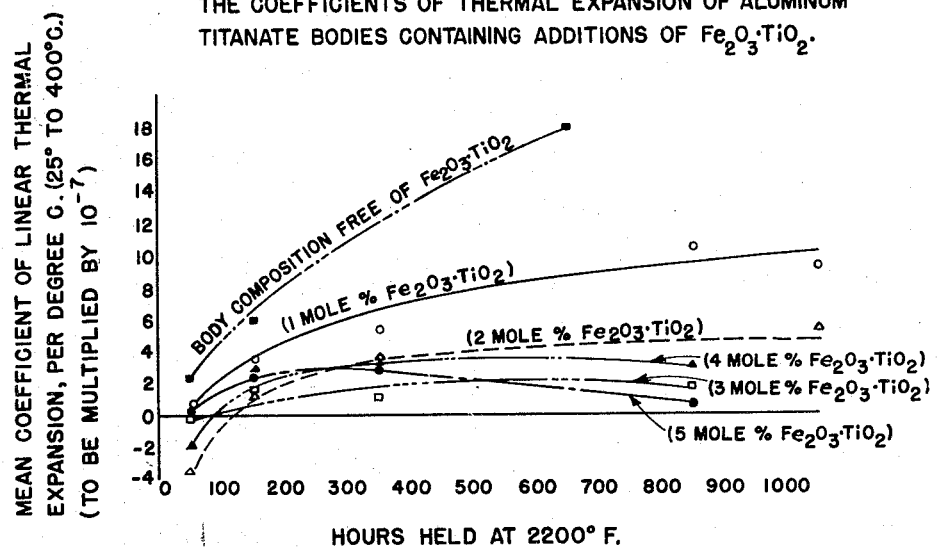
Figure 5:
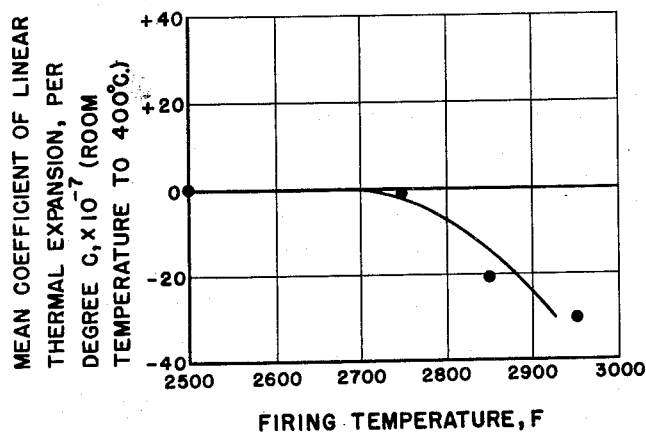

Figure 4 illustrates the stabilizing effect of various percentages of iron titanate in aluminum titanate in a body composition of the type shown in the previous example. The best low expansion characteristic for general purposes is exhibited at approximately 3 mole percent, but it should be noted that the samples from which these data were derived were fired initially at 2800° F., and that other characteristics will be obtained when different firing temperatures are employed. This effect is shown, as to an 80% $Al_2O_3 \cdot TiO_2$—20% $Fe_2O_3 \cdot TiO_2$ composition, in Figure 5.

Figure 6:
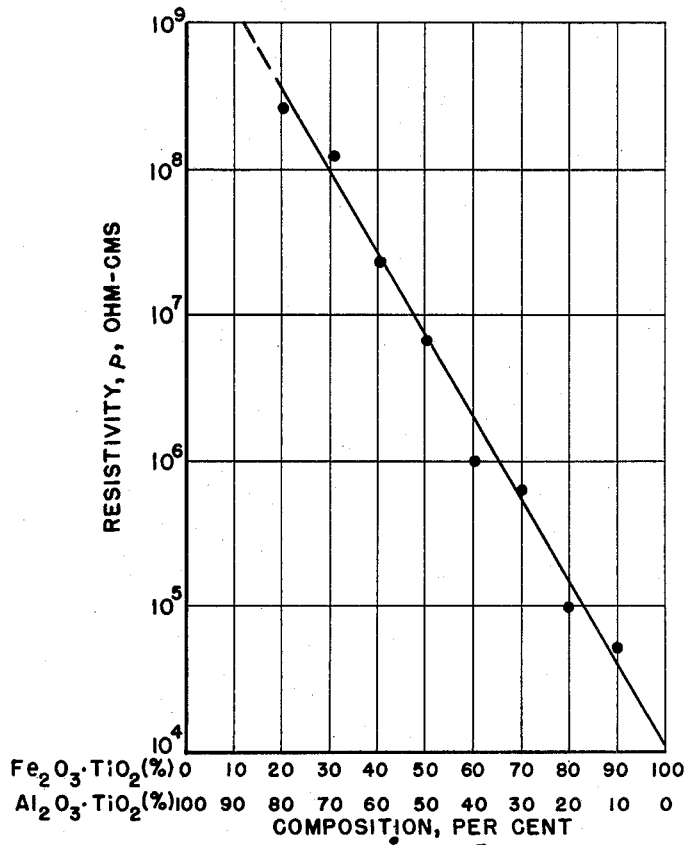
Figure 7:
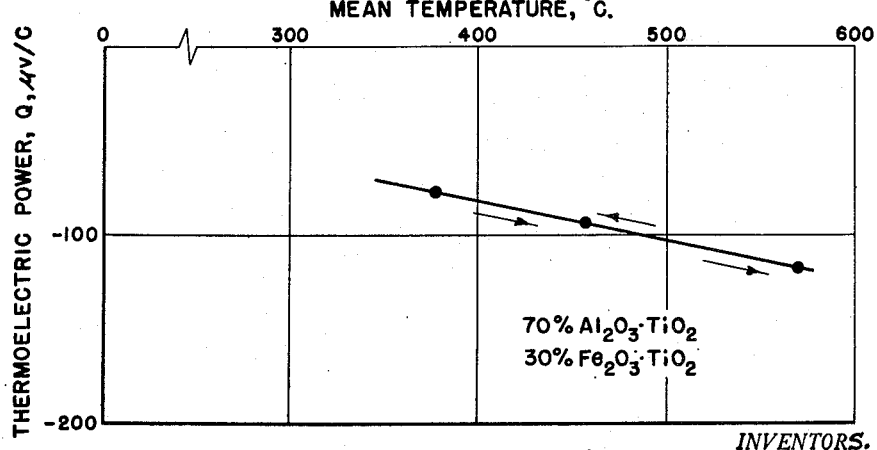

Electrical resistivity values of an aluminum titanate-iron titanate series at room temperature are shown in Figure 6, and the thermoelectric power characteristics of a composition containing 70% $Al_2O_3 \cdot TiO_2$ and 30% $Fe_2O_3 \cdot TiO_2$ are shown in Figure 7. These data indicate that compositions of the present invention possess desirable electrical properties.

In general, the compositions of the present invention are adapted to be used for a wide variety of purposes wherever low thermal expansion characteristics are desired in conjunction with refractory properties. By virtue of these characteristics the compositions are well suited for use in kiln furniture, muffles, saggers, posts, and slabs used in the ceramic industry or in heat treating equipment, in combustion tubes and thermocouple tubes, in plug gages or similar precision measuring apparatus, and in laboratory equipment such as furnace parts, linings, crucibles and the like.

Silicon and magnesium have been found to possess some of the properties of iron in the stabilization of aluminum titanate compositions, and various combinations of iron, silicon and magnesium possess similar properties. In general, magnesium and iron appear to provide the desired results by isomorphic replacement of aluminum in the aluminum titanate crystal structure. Thus, ions of iron and magnesium are of the same approximate size as aluminum and behave isomorphically in respect to it. On the other hand, silicon titanate, as a compound, is not known nor believed to exist, and the capacity of silicon to stabilize aluminum titanate against thermal disassociation is believed to be accomplished by its molecular substitution for aluminum in the aluminum titanate crystal structure. All three elements, i. e., iron, magnesium and silicon, are characterized in that each possesses 2 electrons in the s band in the outer shell and have ionic radii comparable to that of aluminum and titanium which may account for their reception in the crystal structure to provide a pseudobrookite type of material. For the purposes of the present disclosure, therefore, the term molecular displacement is employed to identify the change which occurs, the replacement being an isomorphic substitution in respect to iron and magnesium, and being a straight displacement in the case of silicon.

The properties which are produced through the molecular displacement of aluminum by iron, magnesium, or silicon in the aluminum titanate crystal structure vary with the particular member or combination of the series which is employed. As previously indicated, small percentages of iron exert a pronounced stabilizing effect, whereas larger percentages of silicon and magnesium are generally required; thus, it might be said that the stabilizing ability of silicon and magnesium is not as great as that of iron for a given percentage, and these materials, therefore, may, in terms of their function, be treated as only partial equivalents. However, it is also to be observed that complete stabilization, or the ultimate degree of stabilization which iron can afford, is not requisite for many purposes, as in those instances wherein the operating temperature to which the resultant product is to be exposed is not very high, or when the number of cycles of reheating which the product must withstand is not large. In addition, iron, when present in substantial quantities, confers semi-conductor properties upon a stabilized titanate composition which, for certain electrical purposes, may be undesirable. In such event, one may choose silicon or magnesium to accomplish stabilization without introducing this property. The same is true where the color of iron is undesirable, or where its case of reduction imparts undesirable properties.

With respect to the use of magnesium in the practice of this invention, the employment of the dititanate thereof, MgO·2TiO2, is illustrative. A composition containing equimolecular proportions of aluminum titanate and magnesium dititanate was prepared by firing at 2800° F. The fired product was of good color, had an absorption of only 3.1%, and a mean coefficient of linear expansion of 7.46×10⁻⁷ per degree C. One hundred hour heat treatment at 2200° F. of a composition composed of 80 moles Al2O3·TiO2 and 20 moles MgO·2TiO2 and which had been fired at 2750° F. changed the coefficient of expansion from −26×10⁻⁷ per degree C. to −7.5×10⁻⁷. Thus, although such a composition is less stable than an iron-stabilized aluminum titanate at elevated temperature, the members of this series are iron-free and have many desirable properties for moderate temperature applications.

Figure 8:
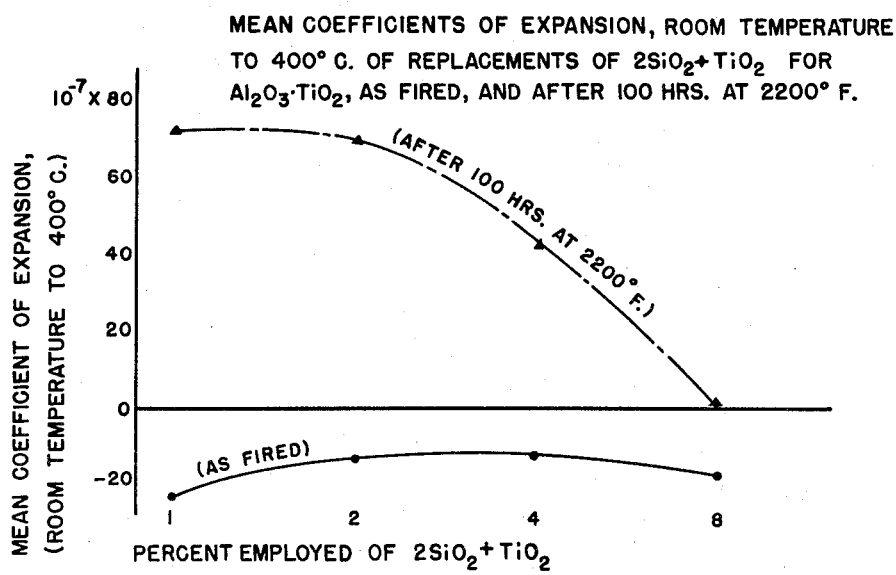

When silica is to be employed, it is preferably used in admixture with TiO2 in a ratio of 2 moles SiO2 to 1 mole TiO2, sufficient quantity of such a mixture being used to provide up to 10 weight percent of SiO2 in the resultant aluminum titanate composition. Thus, the composition 2SiO2+TiO2 appears to become substituted for Al2O3·TiO2 in that proportion upon heating. If silica is not introduced in this ratio, then free silica or free titania will appear although no adverse effect may result. Introduction of silica in amounts greater than 10 weight percent is not generally desirable. Coefficients of expansion, room temperature to 400° C., of compositions of aluminum titanate in which 2SiO2+TiO2 has replaced Al2O3·TiO2 are shown in Figure 8, as fired, and after 100 hours at 2200° F.

Analysis of the structure of aluminum titanate suggests that up to one-third of the aluminum ions can be replaced by silicon ions without disrupting the crystal structure. In the aluminum titanate molecule, two-thirds of the aluminum ions occupy the same positions structurally with respect to oxygen as they occupy in alumina, Al2O3. The remaining one-third of aluminum ions are those which apparently can be replaced by silicon ions. However, when stabilization against loss of thermal shock properties is to be taken into account, it appears that only one-sixth of the aluminum ions may be substituted by silica. Thus, an aluminum titanate composition containing clay and talc according to the previous example contains approximately 7 weight percent of SiO2 and is relatively stable upon prolonged heating, while compositions of greater Si percentage (e. g., 11.5% of SiO2), when exposed for 100 hours to a temperature of 2200° F., increased in coefficient of expansion from 5.45×10⁻⁷ to 33.8×10⁻⁷ per degree C. Such a change is not so drastic as in the case of pure aluminum titanate when heated in similar manner, but is appreciably greater than that which occurs when iron titanate is present.

Three component mixtures also show desirable properties. For example, a combination of 99 mole percent of Al2O3·TiO2 and 1 mole percent of Fe2O3·TiO2 was not entirely stable and neither was a combination of 92 mole percent of Al2O3·TiO2 and 8 mole percent of (2SiO2+TiO2)

However, when the two combinations are mixed together, as 91 mole percent of Al2O3·TiO2, 1 mole percent Fe2O3·TiO2, and 8 mole percent (2SiO2+TiO2), a very stable body is produced having a mean coefficient of linear expansion, from room temperature to 400° C. of −28.2×10⁻⁷, as fired, and a mean coefficient of −26.7×10⁻⁷ after 100 hours of reheating at 2200° F.

Various other combinations and their characteristics are shown in the following table:

*The effect of composition on the thermal expansion of aluminum titanate bodies before and after heating for 100 hours at 2,200° F.*

| Composition in Mole Percent | | Mean Coefficient of Linear [1] Thermal Expansion from Room Temperature to 400° C. | |
|---|---|---|---|
| Al2O3·TiO2 Amount, Mole Percent | Additive, and Amount, Mole Percent | As Fired | After 100 Hours at 2,200° F. |
| 100 | | −17.5 | +68.0 |
| 99 | 1Fe2O3·TiO2 | no data | +5.5 |
| 98 | 2Fe2O3·TiO2 | no data | −16.8 |
| 96 | 4Fe2O3·TiO2 | −8.3 | −22.1 |
| 90 | 10Fe2O3·TiO2 | −23.5 | −20.1 |
| 80 | 20Fe2O3·TiO2 | −29.6 | no data |
| 60 | 40Fe2O3·TiO2 | −6.9 | no data |
| 50 | 50Fe2O3·TiO2 | +5.8 | +6.3 |
| 20 | 80Fe2O3·TiO2 | +8.1 | no data |
| 10 | 90Fe2O3·TiO2 | +26.3 | no data |
| 0 | 100Fe2O3·TiO2 | +25.9 | no data |
| 99 | 1(2SiO2+TiO2) | −23.7 | +73.2 |
| 98 | 2(2SiO2+TiO2) | −14.4 | +71.6 |
| 96 | 4(2SiO2+TiO2) | −12.5 | +43.8 |
| 92 | 8(2SiO2+TiO2) | −17.0 | +1.5 |
| 84 | 16(2SiO2+TiO2) | +5.5 | +33.8 |
| 80 | 20MgO·2TiO2 | −26.3 | −7.5 |
| 60 | 40MgO·2TiO2 | +0.7 | −1.2 |
| 40 | 60MgO·2TiO2 | +7.0 | +11.7 |
| 20 | 80MgO·2TiO2 | +25.3 | +22.1 |
| 0 | 100MgO·2TiO2 | +42.8 | +32.2 |
| 91 | {1Fe2O3·TiO2, 8(2SiO2+TiO2)} | −28.2 | −26.7 |
| 90 | {2Fe2O3·TiO2, 8(2SiO2+TiO2)} | −23.5 | [2] −24.2 |
| 88 | {4Fe2O3·TiO2, 8(2SiO2+TiO2)} | −25.2 | −29.0 |
| 70 | {22MgO·2TiO2, 8(2SiO2+TiO2)} | −9.9 | [2] −7.2 |
| 40 | {52MgO·2TiO2, 8(2SiO2+TiO2)} | +12.5 | [2] +10.9 |

[1] Multiplied by 10⁻⁷.
[2] 200 hours instead of 100 hours at 2,200° F.

Having described our invention, we claim:

1. The method of producing a thermally stable aluminum titanate composition possessing a low coefficient of expansion, which method comprises, heating to a temperature of approximately 2400° F. a mixture of aluminum titanate, iron oxide, and titania in proportions sufficient to incorporate from about 1 to 50 mole percent of iron titanate into the aluminum titanate, and thereby produces a composition having a low coefficient of expansion and possessing stability against thermal decomposition.

2. Aluminum titanate having approximately 1 to 50 mole percent of iron titanate in solid solution therewith, the said iron titanate being effective to stabilize the aluminum titanate against decomposition during heating and reheating thereof at temperatures above approximately 1700° F.

3. The method of stabilizing aluminum titanate against decomposition at high temperatures, which method comprises heating the aluminum titanate to a temperature above approximately 2400° F. while it is in a mixture with a sufficient quantity of iron titanate to render the resultant product stable against high temperature decomposition.

4. The method of stabilizing aluminum titanate against thermal decomposition at elevated temperature without substantially impairing its low coefficient of expansion, which method comprises incorporating from approximately 1 to 50 mole percent of iron titanate in the aluminum titanate by heating the aluminum titanate to a temperature of at least 2400° F. while the aluminum titanate is admixed with iron titanate.

5. The method of producing a ceramic composition which has a low coefficient of expansion and is stable against thermal decomposition when heated and reheated to temperatures above approximately 1700° F., which method comprises heating to a temperature of at least approximately 2400° F. a mixture consisting essentially of the constituting components of aluminum titanate and iron titanate, the proportions being such that approximately 1 to 50 mole percent of iron titanate enters into solid solution with the aluminum titanate and thereby stabilizes the aluminum titanate against thermal decomposition.

6. As a new composition of matter aluminum titanate containing approximately 1 to 50 mole percent of isomorphically substituted iron titanate in its crystal structure, whereby the said composition of matter is stabilized against decomposition upon heating and reheating to temperatures above approximately 1700° F.

7. Aluminum titanate having a substantial quantity up to approximately 50 mole percent of a stabilizing agent of the class consisting of iron titanate, magnesium titanate, and silica in solid solution therewith, the said stabilizing agent being in amount sufficient to stabilize the aluminum titanate against thermal decomposition during heating and reheating thereof at temperatures above approximately 1700° F.

No references cited.